US007944626B2

(12) United States Patent
Lin

(10) Patent No.: US 7,944,626 B2
(45) Date of Patent: May 17, 2011

(54) WIDE ANGLE LENS MODULE AND VEHICLE VISION SYSTEM

(75) Inventor: Chun-Ling Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/842,012

(22) Filed: Jul. 22, 2010

(65) Prior Publication Data

US 2010/0284095 A1 Nov. 11, 2010

Related U.S. Application Data

(62) Division of application No. 12/061,888, filed on Apr. 3, 2008, now Pat. No. 7,796,348.

(30) Foreign Application Priority Data

Aug. 22, 2007 (CN) .......................... 2007 1 0201428

(51) Int. Cl.
*G02B 9/64* (2006.01)
*G02B 13/04* (2006.01)

(52) U.S. Cl. ....................................... 359/755; 359/751

(58) Field of Classification Search .................. 359/751, 359/755

See application file for complete search history.

(56) References Cited

U.S. PATENT DOCUMENTS 5,625,497 A * 4/1997 Emomoto .................... 359/751

* cited by examiner

*Primary Examiner* — Jack Dinh
(74) *Attorney, Agent, or Firm* — Zhigang Ma

(57) ABSTRACT

A wide angle lens module includes a first lens and a second lens with negative refracting power, a third lens and a fourth lens with positive refracting power, a fifth lens with negative refracting power, a sixth lens with positive refracting power, and a seventh lens with negative refracting power. The first lens, the second lens, the third lens, the fourth lens, the fifth lens, the sixth lens, and the seventh lens are assembled in order from an object side to an image side.

20 Claims, 12 Drawing Sheets

12
14
13
146
144
148
18
128
126
124
122
16

WIDE ANGLE LENS MODULE AND VEHICLE VISION SYSTEM

CROSS REFERENCE

This application is a divisional application of patent application Ser. No. 12/061,888 filed on Apr. 3, 2008 from which it claims the benefit of priority under 35 U.S.C. 120. The patent application Ser. No. 12/061,888 in turn claims the benefit of priority under 35 USC 119 from Chinese Patent Application 200710201428.2, filed on Aug. 22, 2007.

BACKGROUND

1. Technical Field

The present disclosure generally relates to lens modules and vehicles, and more particularly, to a wide angle lens module and a vehicle vision system having the wide angle lens module.

2. Description of Related Art

It is known that vehicles such as cars and trucks have blind spots even when an operator uses rear view mirrors. Therefore, a camera-based rear view vision system has been proposed to eliminate the blind spots.

Typically, the camera-based rear view vision system includes a camera located on the rear of the vehicle. However, the field of vision of the typical camera used in the vision systems is narrow and may still leave blind spots.

Therefore, what is desired is to provide a camera with a wide angle lens module and a vehicle vision system having the wide angle lens module for providing viewing angles that eliminate blind spots around the vehicle.

DETAILED DESCRIPTION

Embodiments of the disclosure will now be described in detail, with reference to the accompanying drawings.

Figure 1:
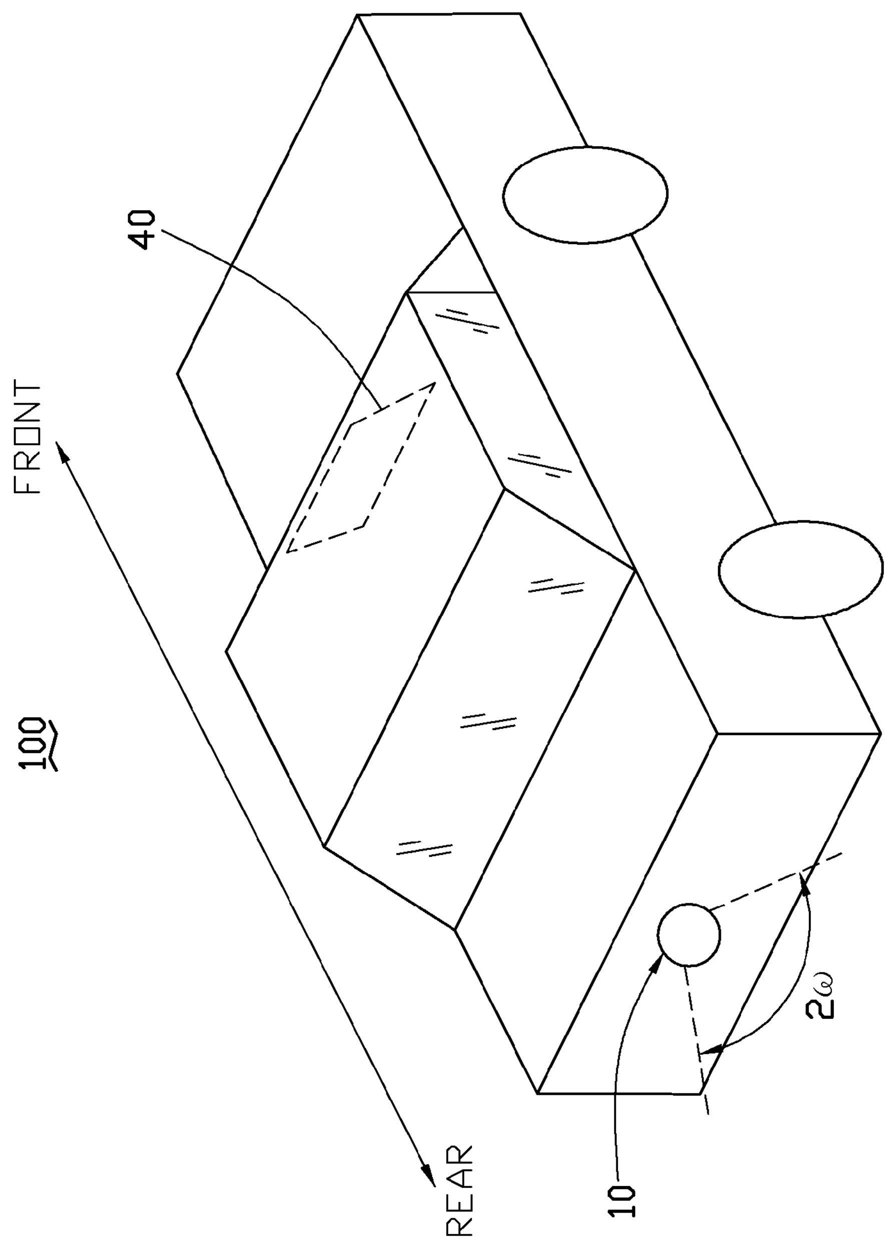
FIG. 1 is a vehicle having a wide angle lens module according to an exemplary embodiment.
Figure 2:
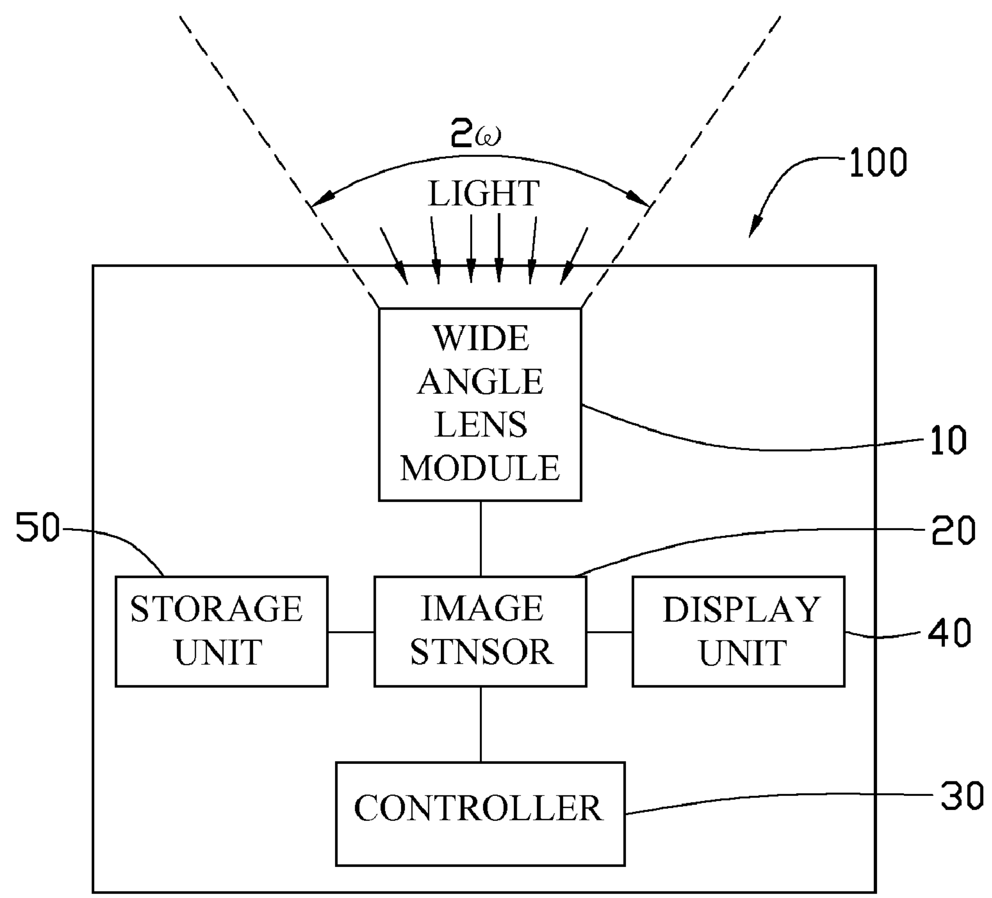
FIG. 2 is a block diagram of the vehicle as illustrated in FIG. 1.

Referring to FIGS. 1 and 2, a wide angle lens module 10 may be rigidly mounted to a rear panel of a vehicle 100 and directed substantially to the rear of the vehicle 100. The vehicle 100 includes an image sensor 20 such as a charge coupled device (CCD), a controller 30, a display unit 40 such as a liquid crystal display (LCD), and a storage unit 50 such as a hard disk drive (HDD).

The wide angle lens module 10 is used for receiving light beams emitted by or reflected from outside objects existing in a wide viewing angle that can be greater than 140°. The light beams received by the wide angle lens module 10 are directed to the image sensor 20. The image sensor 20 converts the light beams received from the wide angle lens module 10 to electrical signals, which are digitized to form digital images. The digital images are displayed on the display unit 40. The digital images may also be encoded to image files, which are stored in the storage unit 50. The controller 30 is a processing unit for controlling various operations of the vehicle 100.

Figure 3:
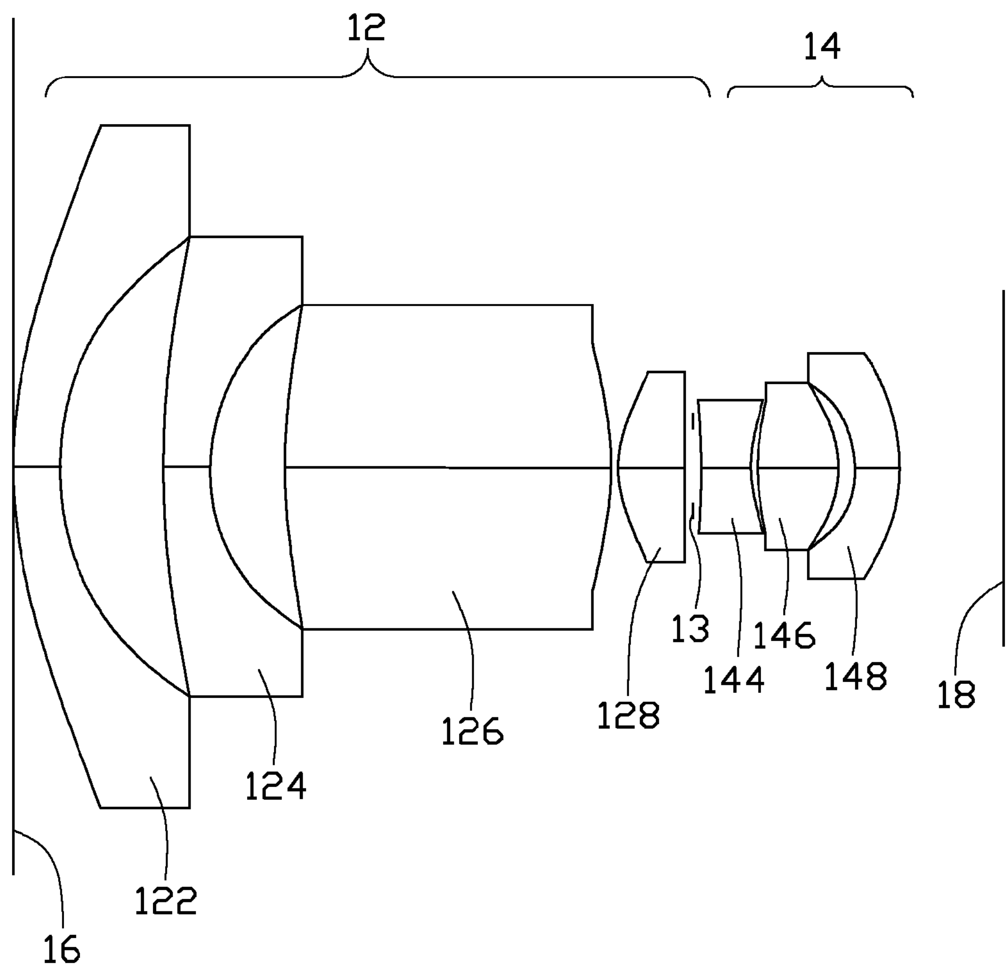
FIG. 3 is a block diagram of the wide angle lens module as illustrated in FIG. 1.

Referring to FIG. 3, the wide angle lens module 10 includes a first lens group 12 and a second lens group 14. The first lens group 12 and the second lens group 14 are disposed in an order from an object side 16 to an image side 18. The wide angle lens module 10 is designed to be a fixed-focal type wide angle lens module, such that a distance between the first lens group 12 and the second lens group 14 is not adjustable.

The first lens group 12 has positive refracting power for effectively receiving incident light beams at wide angles. Preferably, the first lens group 12 satisfies the following condition: $0.8<f12/f<1.2$ (1), wherein f is a system focal length of the wide angle lens module 10, and f12 is an effective focal length of the first lens group 12. The condition (1) is for configuring the wide angle lens module 10 to correct spherical aberrations. If the ratio f12/f is below the lower limit 0.8, astigmatism becomes great and high-order spherical aberrations are difficult to correct. If the ratio f12/f is above the upper limit 1.2, the wide angle lens module 10 will not be compact.

The second lens group 14 also has positive refracting power for converging light beams transmitted from the first lens group 12 to the image sensor 20. Preferably, the second lens group 14 satisfies the following condition: $5<f14/f<25$ (2), wherein f14 is an effective focal length of the second lens group 14. The condition (2) is for designing the wide angle lens module 10 to be similar to a telecentric optical system, such that the light beams transmitted from the first lens group 12 may be more effectively converged to the image sensor 20. If the ratio f14/f is below the lower limit 5, coma aberrations become great and lateral chromatic aberration is difficult to correct. If the ratio f14/f is above the upper limit 25, distortion becomes so great that it may be difficult to correct. The condition (2) is also used for limiting the second lens group 14 having relatively stronger refracting power in order to make an overall length of the wide angle lens module 10 to be shorter.

The first lens group 12 includes a first lens 122, a second lens 124, a third lens 126, and a fourth lens 128 that are assembled in that order from the object side 16 to the image side 18. The first lens 122 and the second lens 124 are both meniscus lenses having negative refractive powers. Convex surfaces of the first lens 122 and the second lens 124 face toward the object side 16. The third lens 126 and the fourth lens 128 are both bi-convex lenses having positive refractive powers.

The second lens group 14 includes a fifth lens 144, a sixth lens 146, and a seventh lens 148. The fifth lens 144 is a bi-concave lens having negative refracting power. The sixth lens 146 is a bi-convex lens having positive refracting power. The seventh lens 148 is a meniscus lens having negative refracting power. A convex surface of the seventh lens 148 faces toward the image side 18.

The first lens 122 satisfies the following condition: $-5.5<f1/f<-4.5$ (3), wherein f1 is a focal length of the first lens 122. The condition (3) is for configuring the first lens 122 to receive light beams incident at wide angles. If the ratio f1/f is below the lower limit −5.5, the wide angle lens module 10 will not be compact. If the ratio f1/f is above the upper limit −4.5, it will be difficult to manufacture the first lens 122, particularly when the material is glass, because the first lens 122 has a relatively small radius of curvature in this condition.

The third lens 126 satisfies the following conditions: ν3<35 (4) and 3.3<f3/f<3.6 (5), wherein ν3 is an Abbe number of the third lens 126 at d-line, and f3 is a focal length of the third lens 126. The condition (4) is for configuring the wide angle lens module 10 to correct the system chromatic aberration. The condition (5) is for configuring the wide angle lens module 10 to correct the distortion. If the ratio f3/f is below the lower limit 3.3, it is difficult to manufacture the third lens 122. If the ratio f3/f is above the upper limit 3.6, the third lens 126 may not be able to provide sufficient positive refracting power and it may be difficult to correct the spherical aberration and distortion.

The sixth lens 146 satisfies the following condition: 1<f6/f<1.2 (6), wherein f6 is a focal length of the sixth length 146. The condition is for configuring the wide angle lens module 10 to correct astigmatism. If the ratio f6/f is below the lower limit 1, it is difficult to manufacture the sixth lens 146. If the ratio f6/f is above the upper limit 1.2, it is difficult to correct the astigmatism.

Preferably, the wide angle lens module 10 may further include an aperture stop 13. The aperture stop 13 is positioned between the fourth lens 128 of the first lens group 12 and the fifth lens 144 of the second lens group 14. The aperture stop 13 is used for providing an opening for restricting the amount of light beams transmitted from the first lens group 12 to the second lens group 14. That is, if the aperture stop 13 has a wider opening, the image brightness and definition may be increased, while the depth of field and contrast of the image are correspondingly decreased. The aperture stop 13 may be positioned between lens elements in the first lens group 12 or between lens elements in the second lens group 14 according to specific applications.

In order to control an overall length of the wide angle lens module 10, the wide angle lens module 10 preferably satisfies the following condition: 0.1<f/TTL<0.13 (7), wherein TTL is an overall length of the wide angle lens module 10. If the ratio f/TTL is below the lower limit 0.1, it is difficult to correct high-order spherical aberrations. If the ratio f/TTL is above the upper limit 0.13, it is difficult to effectively shorten the overall length of the wide angle lens 10.

Preferably, the first lens 122, the second lens 124, the third lens 126, the fourth lens 128, the fifth lens 144, the sixth lens 146, and the seventh lens 148 are made of glass material. The glass material lens is more resistant to high temperature, erosion, scratches etcetera. Opposite convex and/or concave surfaces of the first lens 122, the second lens 124, the third lens 126, the fourth lens 128, the fifth lens 144, the sixth lens 146, and the seventh lens 148 are spherical, because manufacturing spherical surfaces is more cost effective than manufacturing aspherical surfaces.

The following are symbols used in the exemplary embodiment.

r: radius of curvature d: distance between adjacent two surfaces along optical axis of the wide angle lens module 10 n: refractive index of the lens at d-line

ν: Abbe number of the lens at d-line

EXAMPLE 1

Table 1 shows lens data of the wide angle lens module 10 of a first exemplary embodiment.

TABLE 1 f12/f = 0.8463 f14/f = 21.5039 f1/f = −5.1 f3/f = 3.5 f6/f = 1.1 f/TTL = 0.127

| Surface | r(mm) | d(mm) | n | ν |
|---|---|---|---|---|
| 1st | 11.087 | 0.700 | 1.743972 | 44.8504 |
| 2nd | 4.129 | 1.612 | | |
| 3rd | 17.004 | 0.700 | 1.730126 | 45.9733 |
| 4th | 2.908 | 1.169 | | |
| 5th | 12.423 | 5.000 | 1.755201 | 27.5795 |
| 6th | −6.450 | 0.100 | | |
| 7th | 2.539 | 1.049 | 1.62041 | 60.3236 |
| 8th | −17.265 | 0.100 | | |
| stop | infinite | 0.100 | | |
| 9th | −10.529 | 0.792 | 1.74402 | 28.0464 |
| 10th | 2.965 | 0.100 | | |
| 11th | 4.717 | 1.226 | 1.743972 | 44.8504 |
| 12th | −2.007 | 0.252 | | |
| 13th | −1.518 | 0.700 | 1.755201 | 27.5795 |
| 14th | −3.036 | 1.600 | | |

Figure 4A:
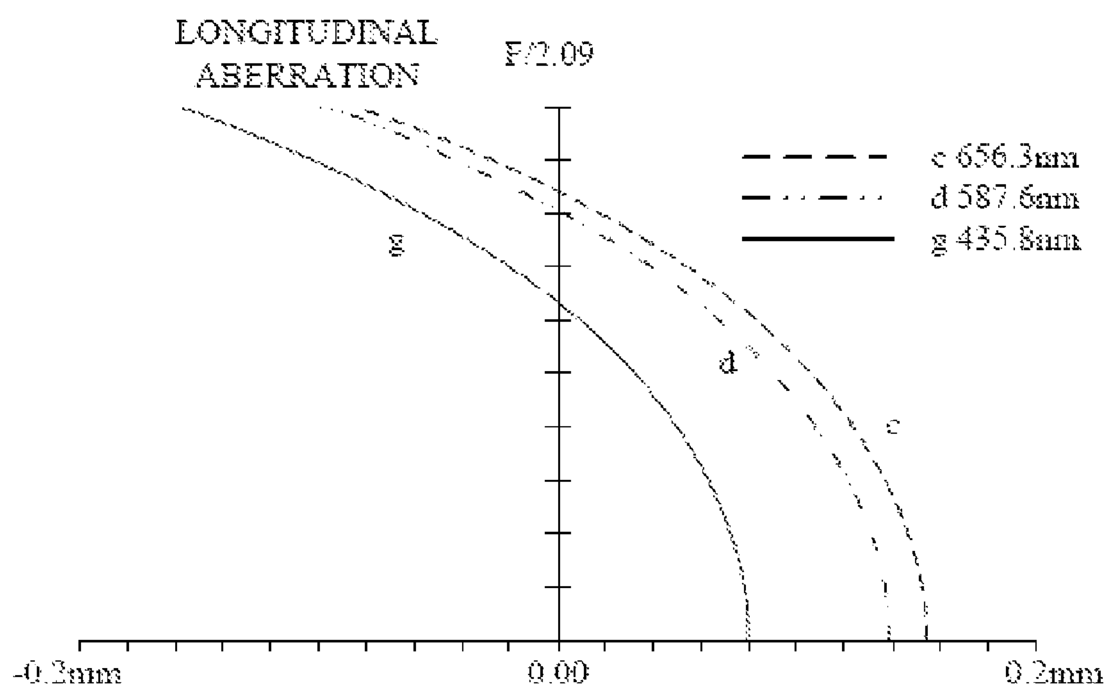
FIGS. 4A-4C respectively illustrates longitudinal spherical aberration, astigmatism, and distortion of a first exemplary embodiment.
Figure 4B:
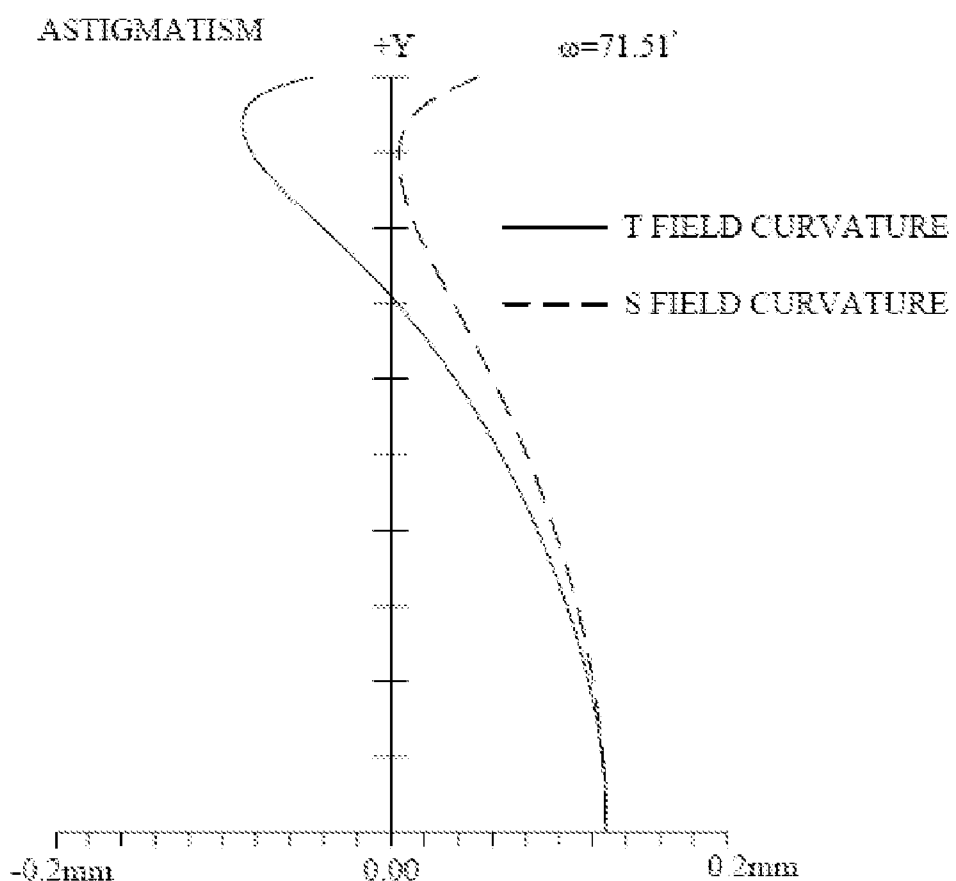
Figure 4C:
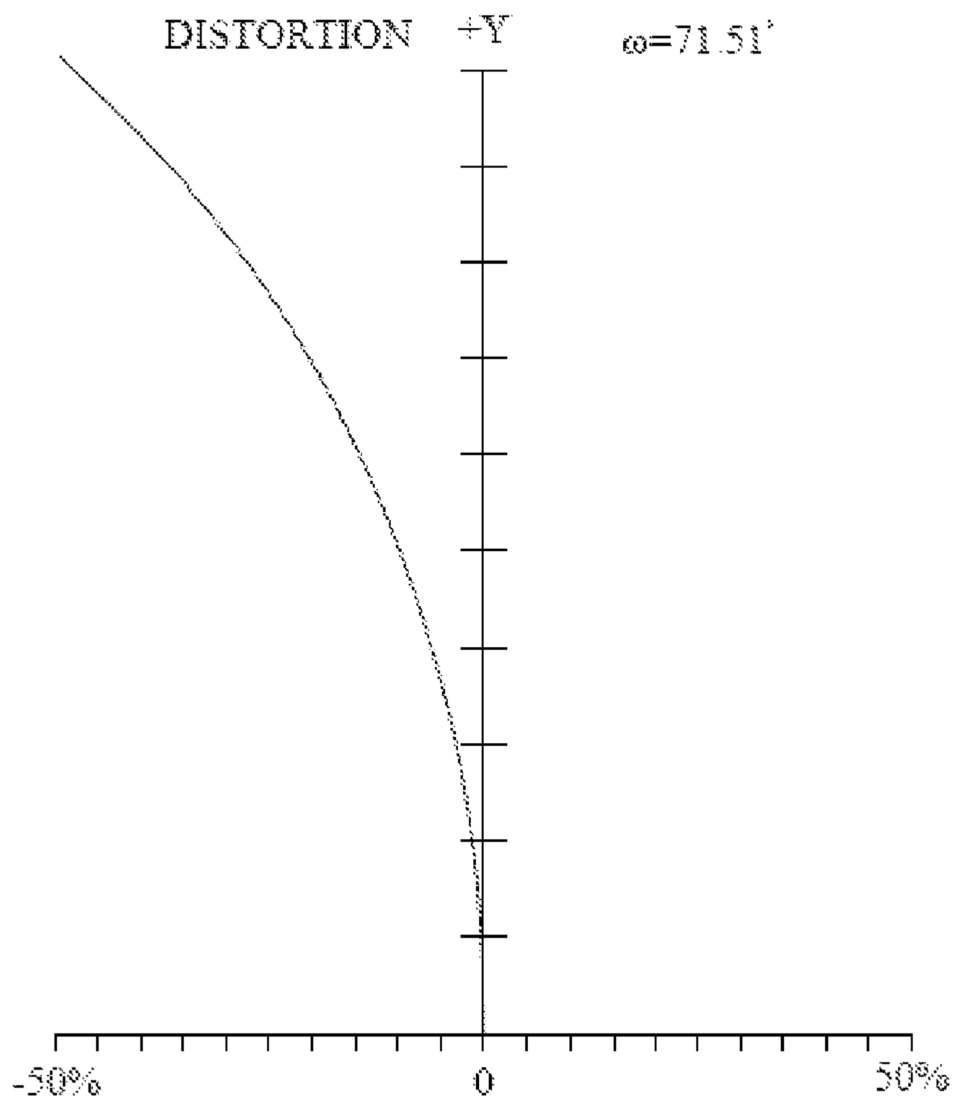

Referring to FIGS. 4A-4C, longitudinal spherical aberrations, astigmatism (field curvature), and distortion are respectively illustrated for the first embodiment of the wide angle lens module 10 having lens data listed in table 1, where half of the field angle (ω) of the first embodiment can be as much as 71.57°.

EXAMPLE 2

Table 2 shows lens data of the wide angle lens module 10 of a second exemplary embodiment.

TABLE 2 f12/f = 0.9381 f14/f = 8.5851 f1/f = −5.49 f3/f = 3.5 f6/f = 1.1 f/TTL = 0.122

| Surface | r(mm) | d(mm) | n | ν |
|---|---|---|---|---|
| 1st | 9.814 | 0.700 | 1.786097 | 44.2503 |
| 2nd | 4.189 | 1.716 | | |
| 3rd | 22.296 | 0.700 | 1.716367 | 47.1926 |
| 4th | 2.896 | 1.585 | | |
| 5th | 9.577 | 4.000 | 1.785201 | 26.5795 |
| 6th | −8.126 | 0.154 | | |
| 7th | 2.711 | 0.990 | 1.62041 | 60.3236 |
| 8th | −13.841 | 0.120 | | |
| Stop | infinite | 0.120 | | |
| 9th | −10.523 | 0.700 | 1.726093 | 28.861 |
| 10th | 3.244 | 0.120 | | |
| 11th | 5.400 | 1.199 | 1.786097 | 44.2503 |
| 12th | −2.010 | 0.243 | | |
| 13th | −1.542 | 0.700 | 1.755201 | 27.5795 |
| 14th | −3.084 | 1.620 | | |

Figure 5A:
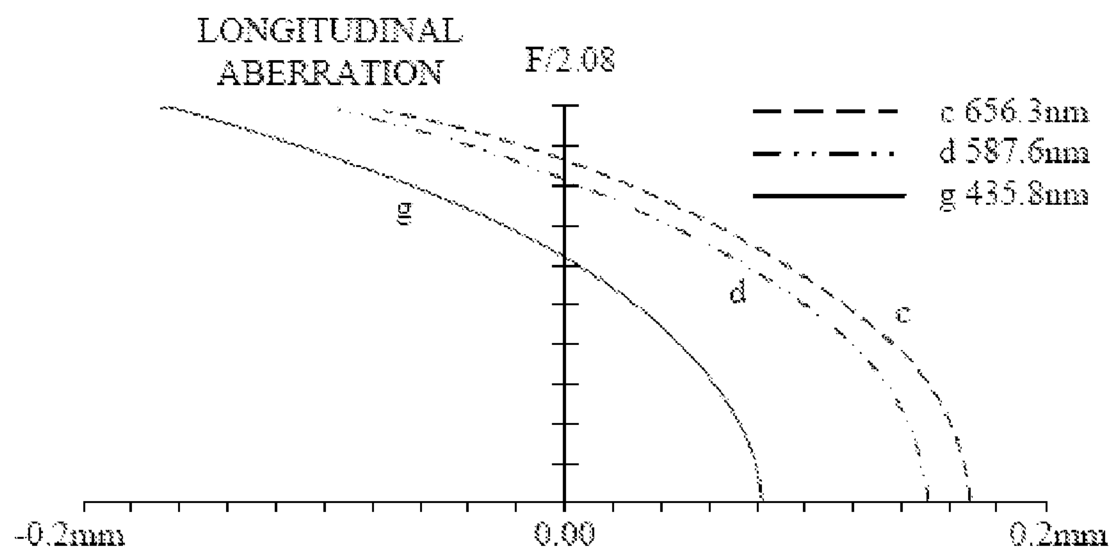
FIGS. 5A-5C respectively illustrates longitudinal spherical aberration, astigmatism, and distortion of a second exemplary embodiment FIGS. 6A-6C respectively illustrates longitudinal spherical aberration, astigmatism, and distortion of a third exemplary embodiment.
Figure 5B:
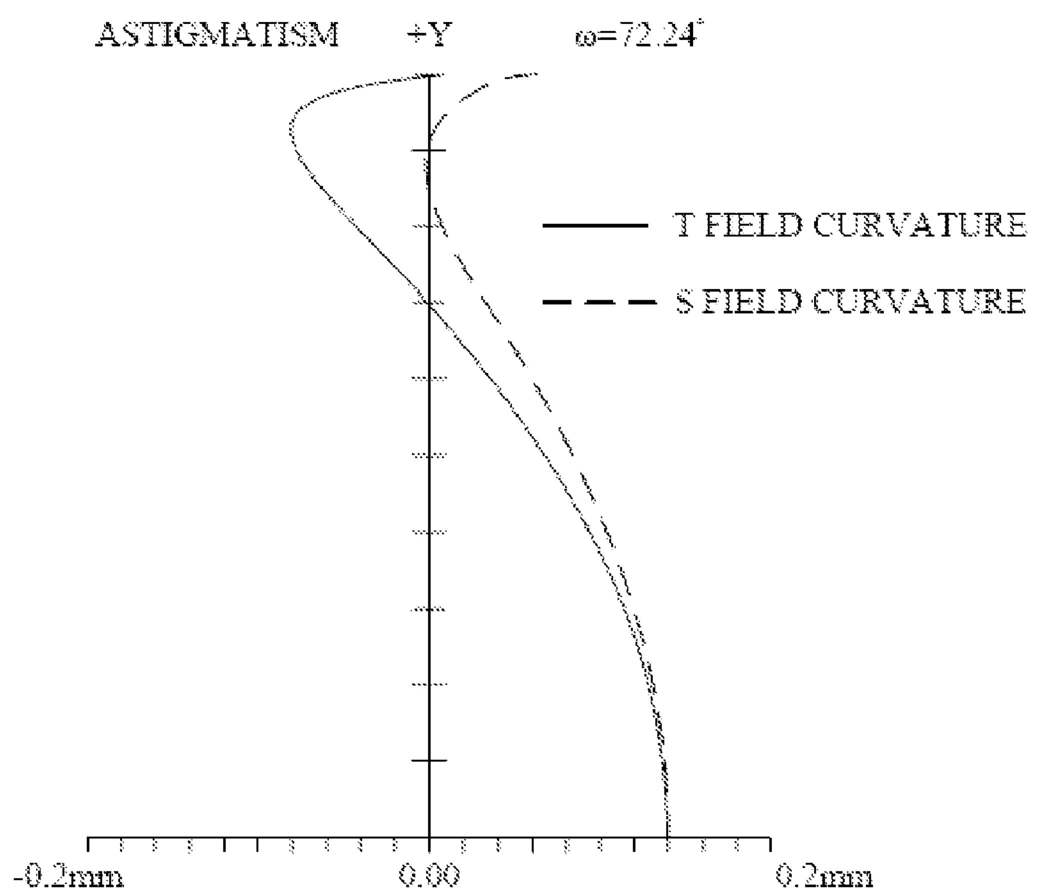
Figure 5C:
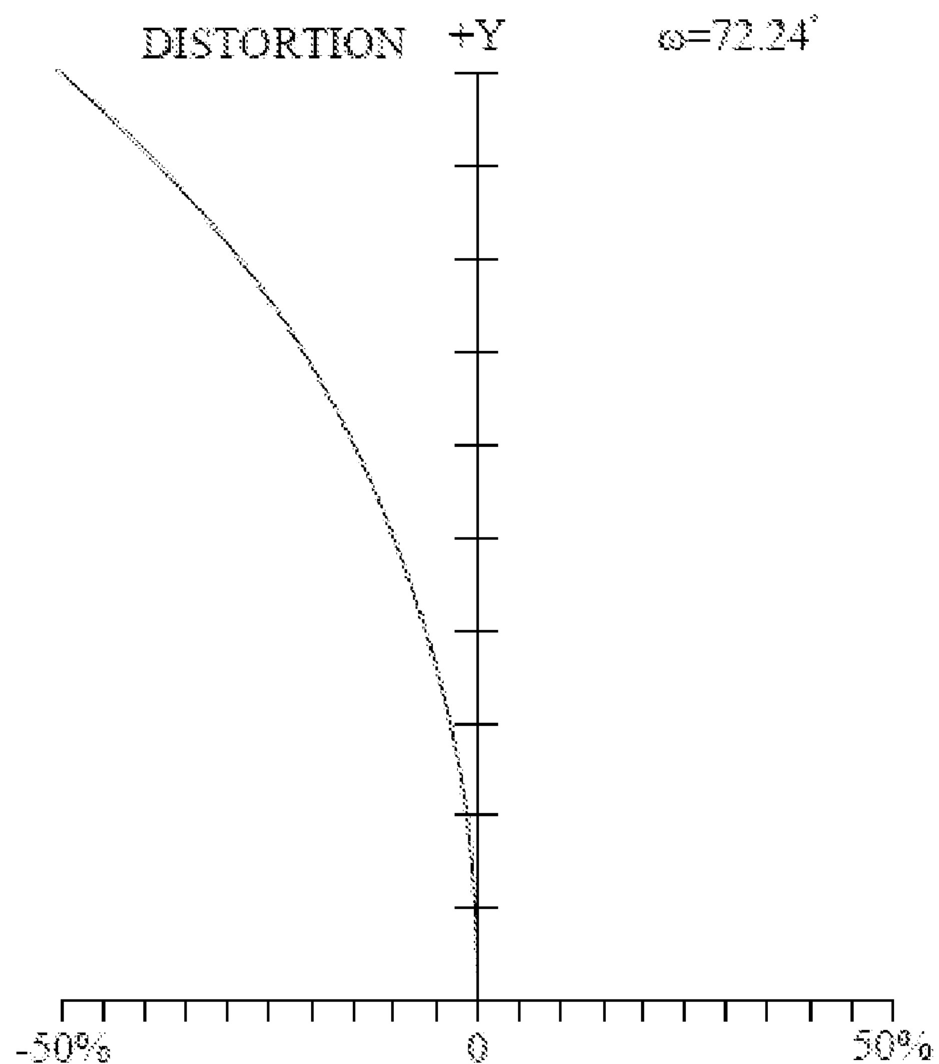

Referring to FIGS. 5A-5C, longitudinal spherical aberrations, astigmatism (field curvature), and distortion are respectively illustrated of a second example of the wide angle lens module 10 having lens data listed in table 2, where half of the field angle (ω) can be as much as 72.24°.

EXAMPLE 3

Table 3 shows lens data of the wide angle lens module 10 of a third exemplary embodiment.

TABLE 3

| f12/f = 1.0353 f14/f = 5.5722 f1/f = −4.91 f3/f = 3.5 f6/f = 1.1 f/TTL = 0.127 | | | | |
|---|---|---|---|---|
| Surface | r(mm) | d(mm) | n | ν |
| 1st | 10.721 | 0.710 | 1.803972 | 42.8504 |
| 2nd | 4.164 | 1.657 | | |
| 3rd | 18.712 | 0.710 | 1.703779 | 48.4112 |
| 4th | 2.950 | 1.310 | | |
| 5th | 11.214 | 3.800 | 1.805201 | 25.5795 |
| 6th | −8.135 | 0.140 | | |
| 7th | 2.849 | 1.139 | 1.62041 | 60.3236 |
| 8th | −13.227 | 0.110 | | |
| Stop | infinite | 0.110 | | |
| 9th | −14.773 | 0.710 | 1.714641 | 29.4296 |
| 10th | 3.144 | 0.105 | | |
| 11th | 5.614 | 1.249 | 1.803972 | 42.8504 |
| 12th | −1.915 | 0.223 | | |
| 13th | −1.558 | 0.710 | 1.785201 | 26.3795 |
| 14th | −3.117 | 1.610 | | |

Figure 6A:
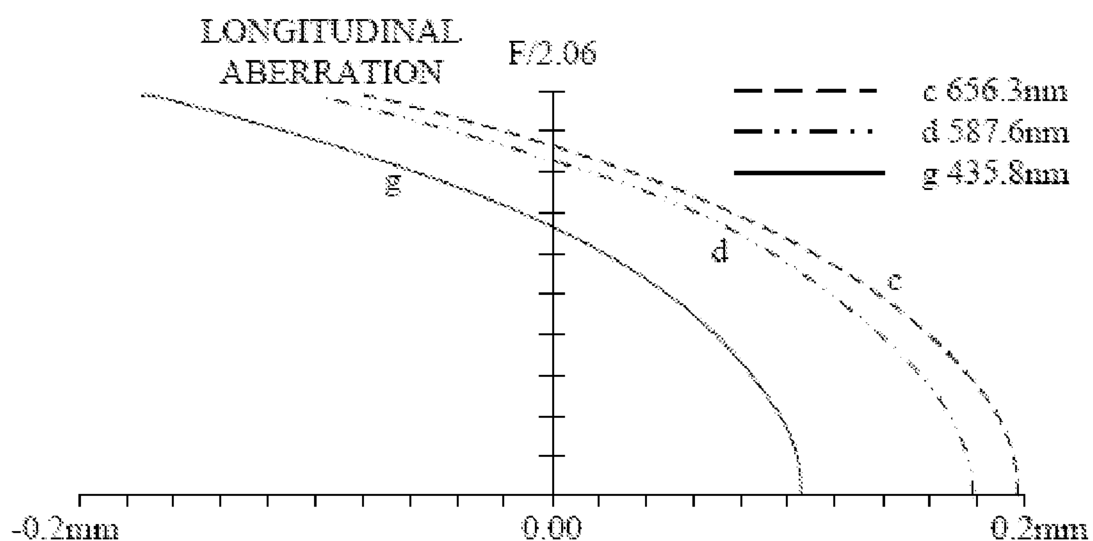
Figure 6B:
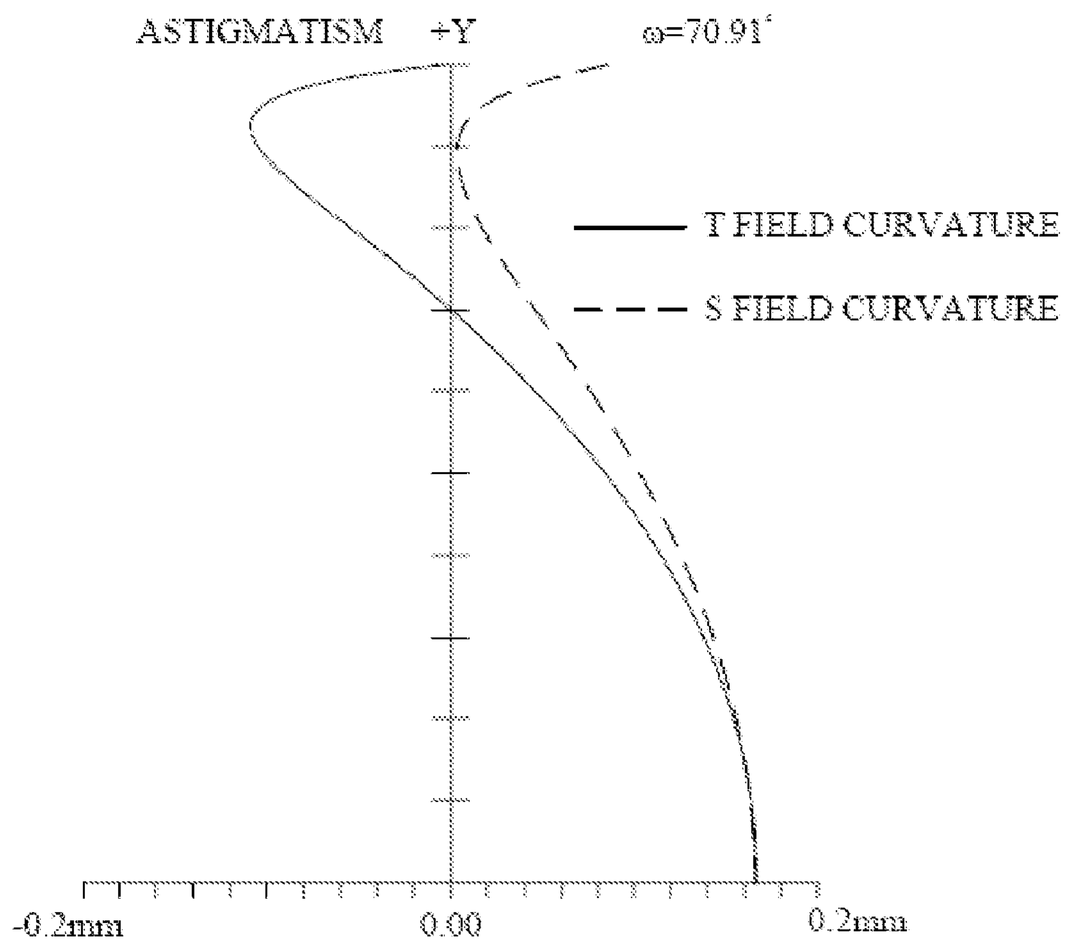
Figure 6C:
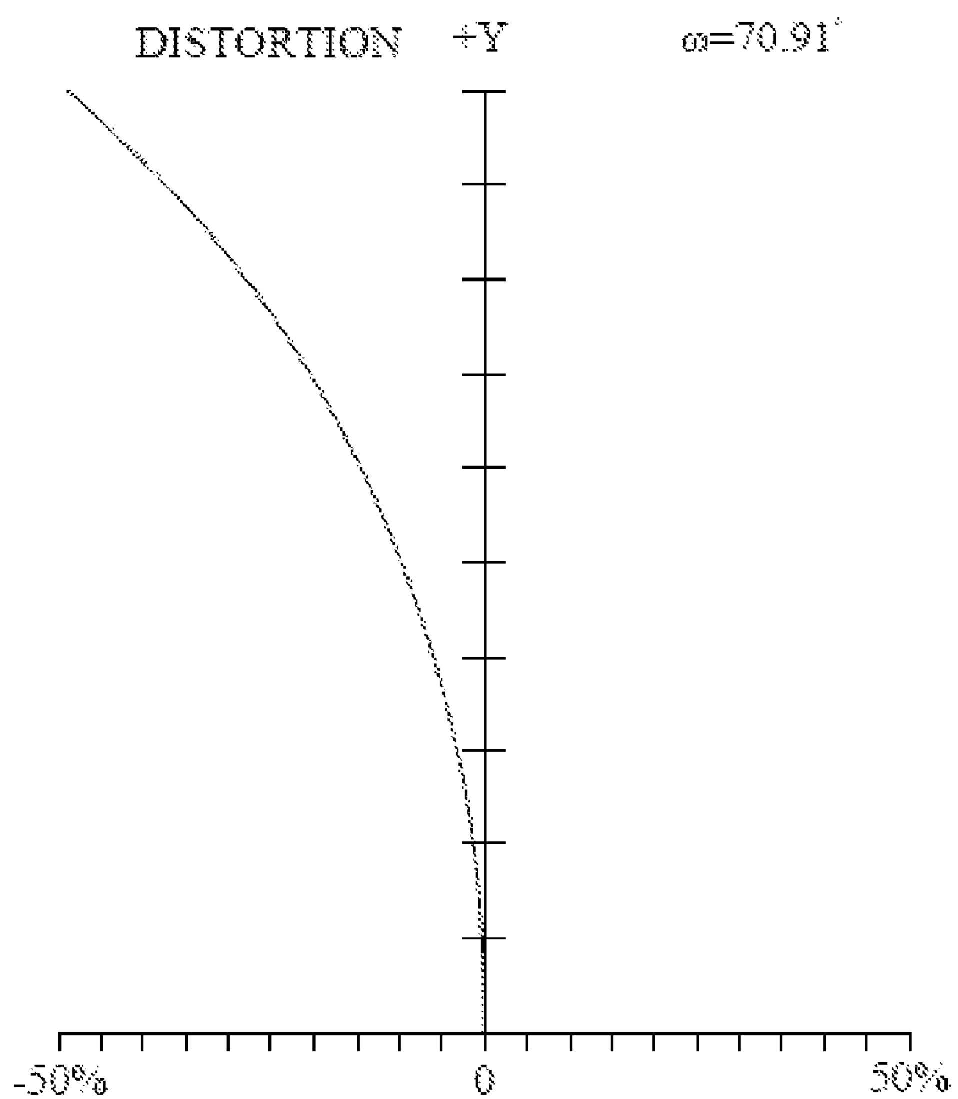

Referring to FIGS. 6A-6C, longitudinal spherical aberrations, astigmatism (field curvature), and distortion are respectively illustrated of a third example of the wide angle lens module 10 having lens data listed in table 2 where half of the field angle (ω) can be as much as 70.91°.

It will be understood that particular embodiments and methods are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A wide angle lens module comprising:

a first lens group with positive refracting power; and a second lens group with positive refracting power, the first lens group and the second lens group being disposed in order from an object side to an image side, the first lens group and the second lens group satisfying the following conditions: 0.8<f12/f<1.2 (1), 5<f14/f<25 (2), wherein f12 is an effective focal length of the first lens group, f14 is an effective focal length of the second lens group, and f is a focal length of the wide angle lens module.

2. The wide angle lens module as described in claim 1, wherein the first lens group comprises:

a first lens with negative refracting power;

a second lens with negative refracting power;

a third lens with positive refracting power, the first lens and the third lens satisfying the following conditions: −5.5<f1/f<−4.5 (3), 3.3<f3/f<3.6 (4), ν3<35 (5), wherein f1 is a focal length of the first lens, f3 is a focal length of the third lens, ν3 is an Abbe number of the third lens; and a fourth lens with positive refracting power.

3. The wide angle lens module as described in claim 2, wherein the first lens is a meniscus lens having a convex surface facing toward the object side.

4. The wide angle lens module as described in claim 2, wherein the second lens is disposed between the first lens and the third lens, the second lens is a meniscus lens having a convex surface facing toward the object side.

5. The wide angle lens module as described in claim 2, wherein the third lens and the fourth lens are bi-convex lenses.

6. The wide angle lens module as described in claim 1, wherein the second lens group comprises:

a fifth lens with negative refracting power;

a sixth lens with positive refracting power, the sixth lens satisfying the following condition: 1<f6/f<1.2 (6), wherein f6 is a focal length of the sixth lens; and a seventh lens with negative refracting power.

7. The wide angle lens module as described in claim 6, wherein the fifth lens is a bi-concave lens and the sixth lens is a bi-convex lens, the sixth lens is disposed between the fifth lens and the seventh lens.

8. The wide angle lens module as described in claim 6, wherein the seventh lens is a meniscus lens having a convex surface facing toward the image side.

9. The wide angle lens module as described in claim 1, wherein the wide angle lens module further satisfies the following condition: 0.1<f/TTL<0.13, wherein TTL is an overall length of the wide angle lens module.

10. The wide angle lens module as described in claim 1, wherein the wide angle lens module further satisfies the following condition: 2ω>140°, wherein ω is a half field angle of the wide angle lens module.

11. The wide angle lens module as described in claim 1, wherein the wide angle lens module further comprises:

an aperture stop, the aperture stop is disposed between the first lens group and the second lens group.

12. The flash module as claimed in claim 1, wherein the lens data of the wide angle lens module is: 0.8<f12/f≦1.0353.

13. The flash module as claimed in claim 12, wherein the lens data of the wide angle lens module is: 0.8463≦f12/f≦0.9381.

14. A vehicle vision system configured for capturing images around a vehicle, the vehicle vision system comprising:

a wide angle lens module mounted to a portion of the vehicle for receiving light beams originated from objects around the vehicle, the wide angle lens module comprising:

a first lens group with positive refracting power; and a second lens group with positive refracting power, the first lens group and the second lens group being disposed in order from an object side to an image side, the first lens group and the second lens group satisfying the following conditions: 0.8<f12/f<1.2 (1), 5<f14/f<25 (2), wherein f12 is an effective focal length of the first lens group, f14 is an effective focal length of the second lens group, and f is a focal length of the wide angle lens module;

an image sensor for receiving light beams transmitted from the wide angle lens module and generating digital images;

a display unit for displaying the digital images.

15. The vehicle vision system as described in claim 14, wherein the first lens group comprises:

a first lens with negative refracting power;

a second lens with negative refracting power;

a third lens with positive refracting power, the first lens and the third lens satisfying the following conditions: −5.5<f1/f<−4.5 (3), 3.3<f3/f<3.6 (4), ν3<35 (5), wherein f1 is a focal length of the first lens, f3 is a focal length of the third lens, ν3 is an Abbe number of the third lens; and a fourth lens with positive refracting power.

16. The vehicle vision system as described in claim 14, wherein the second lens group comprises:

a fifth lens with negative refracting power;

a sixth lens with positive refracting power, the sixth lens satisfying the following condition: $1<f6/f<1.2$ (6), wherein f6 is a focal length of the sixth lens; and a seventh lens with negative refracting power.

17. The vehicle vision system as described in claim 14, wherein the wide angle lens module further satisfies the following condition: $0.1<f/TTL<0.13$ (7), wherein TTL is an overall length of the wide angle lens module.

18. The vehicle vision system as described in claim 14, wherein the wide angle lens module further satisfies the following condition: $2\omega>140°$ (8), wherein ω is a half field angle of the wide angle lens module.

19. The vehicle vision system as described in claim 14, wherein the lens data of the wide angle lens module is: $0.8<f12/f\leqq 1.0353$.

20. The vehicle vision system as described in claim 19, wherein the lens data of the wide angle lens module is: $0.8463\leqq f12/f\leqq 0.9381$.

* * * * *